3,658,780
POLYMERIZATION OF OLEFINS
Jack S. Scoggin, Bartlesville, Okla., assignor to
Phillips Petroleum Company
Filed Oct. 22, 1969, Ser. No. 868,418
Int. Cl. C08f *3/02, 3/08*
U.S. Cl. 260—93.7           5 Claims

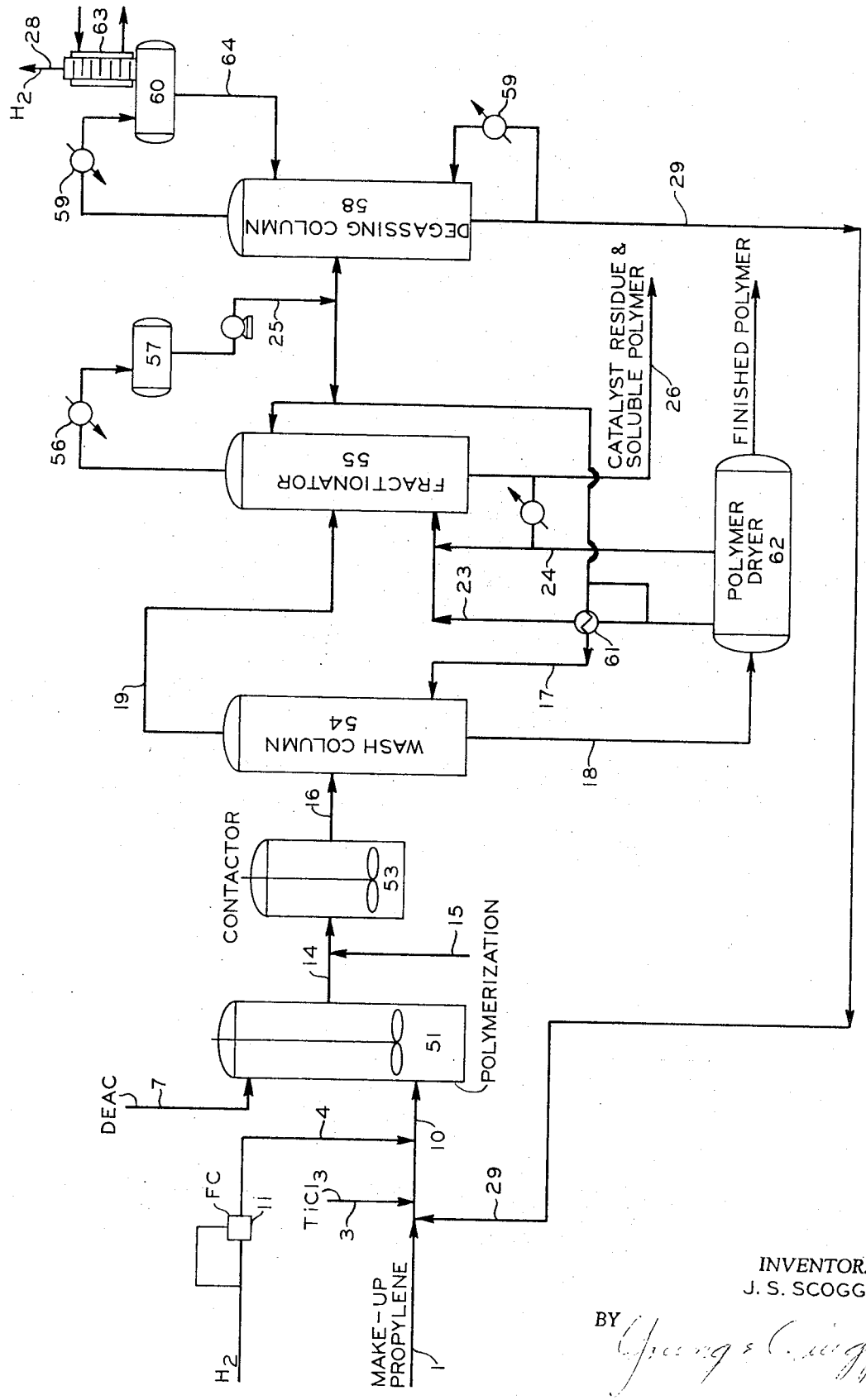

ABSTRACT OF THE DISCLOSURE

In the polymerization of an olefin, e.g., propylene, employing hydrogen as a modifier in the polymerization reaction and excess monomer as solvent to produce a desired melt index polymer, recycled unpolymerized or excess monomer is completely freed of hydrogen by fractionation of the recovered monomer stream by submitting the same to a degassing operation in which in the preferred mode of operation the stream is heated in a fractionation zone to expel hydrogen therefrom and the overhead is refrigerated to avoid undue loss of monomer and all of the modifier hydrogen is added to the polymerization reaction from a single source.

---

In one of its aspects this invention relates to the production of a polymer, for example, a polyolefin, e.g., polypropylene. In another of its aspects it also relates to the production of a pure monomer stream in the production of a polymer, for example, polyolefin, e.g., polypropylene.

In one of its concepts the invention provides a method for the polymerization of a monomer in the presence of a critical proportion of a modifier, e.g., an olefin, for example, propylene, in the presence of, say, a critical proportion of hydrogen wherein the polymerization reaction is effected in the presence of a liquid solvent or diluent which can be the monomer, wherein the solvent is recovered for reuse and wherein the solvent is subjected to a fractionation to obtain pure solvent as a bottoms and the modifier is recovered as an overhead so that the feed of the modifier to the polymerization reaction zone can be from only a single source and, therefore, a readily controllable flow source and feed together with the solvent to be reused is avoided.

In another of its concepts the invention provides a method for the polymerization of an olefin, e.g., propylene, in the presence of a catalyst and a modifier, e.g., hydrogen, in an excess of propylene as solvent wherein the solvent is recovered and reused and wherein the recovery is effected by a fractionation of the used solvent to obtain as a bottoms hydrogen-free propylene and as an overhead hydrogen, the fractionation being one in which the bottoms are slightly reboiled or warmed to obtain the hydrogen-free propylene and the overhead is subject to a refrigerated separation so as to avoid undue loss of propylene gas with the hydrogen which is removed as a final overhead.

Various methods are known for producing normally solid and semi-solid polymers. Recently, considerable attention has been directed toward the production of solid olefin polymers such as polyethylene and polypropylene. These polymerizations are frequently carried out in the presence of a solid catalyst utilizing a liquid solvent, often the monomer, as the reaction medium. The reactions are also normally exothermic so that it is necessary to provide some means for removing the heat of reaction. Polymer characteristics are often affected by conditions of temperature, polymerization rate, polymer concentration, residence times of materials, and modifier concentration, e.g., hydrogen, in the reactor, since these conditions play a significant part in determining the average molecular weight and/or molecular weight distribution or other property of the product. Polymer melt index or melt flow as determined by the ASTM Method D–1238–57T, "Measurement of the flow Rate of Thermoplastics by Extrusion Plastometer," which is a property very important to fabricators, is affected to a considerable extent by the reaction temperature and hydrogen concentration in the reaction liquid when polymerizing propylene to form solid polypropylene. It is with the more accurate and reliable control to such polymerization reactions as well as other reactions that this invention is concerned.

Both melt index and melt flow are used as measures of polymer molecular weight and molecular weight distribution. Both are measured by aforementioned ASTM Method D–1238–57T, the only difference being that melt index is measured at 190° C. according to "Condition E" whereas melt flow is measured at 230° C. according to "Condition L."

It has already been proposed to regulate the melt index, flexural modulus and catalyst productivity in the production of polymers, such as polymers of propylene, by carrying out the polymerization in the presence of a very small concentration of hydrogen as a polymerization modifier. This process, of course, is not free from inconveniences. For example, it is very difficult to keep under control the exact concentration of hydrogen maintained in the liquid phase in the reaction zone and, therefore, regulation of the melt index, flexural modulus, and catalyst productivity within the desired limits; flexural modulus and melt index being dependent upon the polymerization temperature and particularly dependent upon the concentration of hydrogen in the reaction medium during polymerization.

Thus, prior to this invention it was known that melt index of the polymer, e.g., propylene, was critically dependent upon the hydrogen concentration in the polymerization reaction. In U.S. Pat. 3,356,667, Dec. 5, 1967, Dexter E. Smith et al., there is set forth in FIG. 3 a graph showing the great variation of melt index with slight change in the hydrogen concentration in the reactor. Thus, a change of from 0.20 to 0.25 mol percent hydrogen concentration changes the melt index from 5.0 to 9.0. Usually it is desired to produce a product with the melt index varying no more than ±0.2. It is obvious, therefore, that the hydrogen concentration must vary no more than 0.0025 mol percent.

In the patent there is set forth as an object of the invention to provide for controlling the modifier addition rate, especially hydrogen, and its concentration in process streams and/or reactions utilizing modifiers such as hydrogen. The patent sets forth an elaborate scheme for controlling the hydrogen. In FIG. 1 of the patent drawing, controller 38 is responsive to analyzer 36. Operation of the control system is described at least in column 5 of the patent, beginning about line 55.

It has now been found that the operation described in U.S. Pat. 3,356,667, that is to say, the polymerization in the presence of a modifier can be considerably improved. That is to say, minor variations which occur in the modifier concentration in the polymerization zone can be substantially eliminated.

Thus, I have now conceived that the hydrogen should not be controlled as heretofore, that is, by trying to account for the hydrogen in the propylene recycle stream as described in the patent. It has occurred to me that there should be a complete elimination of the hydrogen in the recycle stream. This will permit avoiding the inherent delays involved in analysis of the recycle stream for its contained hydrogen and in then correlating the fresh and recycled hydrogen and then adjusting the fresh hydrogen feed, all of which results often in lack of attainment of the now best possible or very fine control within the very narrow limits which are required to control the melt index as above explained, namely, that hydrogen in the reaction must not vary more than about 0.0025 mol percent.

Further, I have conceived that the propylene should be fractionated to zero hydrogen. To this end I have conceived that the propylene should be fractionated to produce a pure propylene stream, i.e., a stream of propylene-free from hydrogen. Further, the hydrogen-free propylene is obtained by employing a degassing column or zone in conjunction with a refrigerated overhead gasses treatment and a reboiled or slightly warmed bottom portion to reduce to zero the hydrogen in the propylene bottoms taken therefrom. Thus, there is applied some heat to reboil somewhat the bottoms propylene stream to free it from hydrogen and a corresponding amount of refrigeration to prevent undue loss of the propylene with the hydrogen removed as an overhead.

The process of the invention is particularly applicable to the homopolymerization of propylene and the copolymerization of propylene with 1-butene and/or ethylene. However, the invention is broadly applicable to polymerization processes used to produce a wide variety of polymers such as polymers or copolymers of other monoolefins such as ethylene, propylene, butylene and the like and also copolymers of mono-olefins and diolefins such as butadiene, isoprene and the like. It is to be understood that wherever the term "polymer of propylene" or other monomer is used herein, it denotes both homo- and copolymers.

An object of this invention is to provide a polymer. Another object of this invention is to provide a polymer having improved properties. A further object of this invention is to provide a method for so polymerizing a monomer, e.g., an olefin, for example, propylene, that it will have a desired constant melt index. A further object of the invention is to provide a method for polymerization of a monomer, say, an olefin, e.g., propylene, in the presence of a modifier, e.g., hydrogen, wherein the precise amount of modifier present in the polymerization reaction zone is readily and accurately controlled constantly. A still further object of the invention is to provide a method for the recovery of solvent or monomer for reuse in a manner that modifier will not enter the reaction zone with the solvent to be reused and such that it can enter the reaction zone only from a single source which can be controlled to a desired precise flow rate. A still further object of the invention is to provide a method which avoids having to analyze for content of modifier, e.g., hydrogen, in the recycle of solvent for reuse in the polymerization zone. Another object of the invention is to provide a method which avoids having to correlate the inflow of fresh modifier, e.g., hydrogen, with modifier in the recycle stream of solvent to be reused in the polymerization zone. A still further object of the invention is to provide for simplification of an existing operation. A further object still is to provide for elimination of control as practiced in an existing operation.

Other aspects, concepts, objects and the several advantages of the invention are apparent from a study of this disclosure, the drawing and the appended claims.

According to the present invention there is provided a method for the polymerization of a monomer in the presence of a catalyst, a solvent which is recovered and which can be reused, and a catalyst modifier which normally is recovered and reused which comprises in the polymerization zone polymerizing a monomer in the presence of said catalyst, said solvent and said modifier, recovering polymer from said solvent, recovering catalyst residue from said solvent, removing from said solvent all of any modifier remaining therein when said solvent has been recovered and then reusing said solvent whereby correlation of modifier in reused solvent with fresh modifier entering said zone is avoided.

Referring now to the drawing the invention will be described in connection therewith as it applies to the recovery of solvent, propylene, in the catalytic polymerization of propylene in the presence of hydrogen as a modifier.

Referring to the drawing, make-up propylene 1 is passed together with recycle propylene 29 by 10 to propylene polymerization reactor 51. Not shown are conventional steps for purifying the propylene of catalyst poisons such as water, oxygen, etc. Such contaminants are conventionally removed by adsorption, extraction, etc. Catalyst ingredients, e.g., titanium trichloride complex and diethylaluminum chloride enter the system by 3 and 7, respectively. It is preferred, but not essential, to add the $TiCl_3$ complex to the propylene feed stream and the DEAC directly to the reaction mass. Hydrogen is added by pipe 4 with the rate carefully controlled by flow controller 11. A similar controller, not shown, is used to control the total flow of propylene in pipe 10.

A simple, pot-type stirred reactor 51 is shown, although other conventional types may be used. Not shown are cooling coils and jackets, pressure and temperature controls, pumps, and other well-known reactor accessories.

The conditions employed in the propylene polymerization reactor will vary somewhat depending on the catalyst system used, production rate desired, heat removal capacity of the reactor, etc. Generally, the temperature will be between about 0 and 160° F. and the pressure sufficient to maintain the propylene in the liquid state, i.e., from 275 to 1000 p.s.i.g. Residence time in reactor 51 can range from about 1 to about 10 hours with a residence time of about 3 hours being preferred for conversion of a desired percentage of the propylene to polypropylene. Under the above-stated conditions of temperature and pressure, the polymer is produced as solid particles in reactor 51. Effluent from reactor 51 thus consists of a reactive slurry of solid polypropylene particles in liquid propylene together with unreacted hydrogen, catalyst, and a small amount of soluble, low molecular weight polypropylene.

Effluent from reactor 51 containing the final polymer product, slurried in residual liquid propylene, is mixed with catalyst-removal agents, acetylacetone and propylene oxide introduced at 15, and the total blend passed into stirred contactor 53 via pipe 14. The catalyst-removal agents react with the residual catalyst components in contactor 53 to convert said components to a soluble state for removal in wash column 54.

Treated effluent from contactor 53 is passed into the top of wash column 54 wherein the solid polymer particles settle slowly through a rising stream of liquid propylene. Countercurrent treatment of the polymer particles with the liquid propylene results in the removal overhead by 19 of a liquid propylene stream containing most of the catalyst residues and soluble polymer. Purified, washed polymer is removed from the bottom of wash column 18 and passed to drying steps such as flashing and extrusion for separation of residual liquid propylene from the final, dry polymer product. Gaseous propylene removed from the flashing and extrusion steps is passed by 24 into the lower portion of fractionator 55 to which is also passed the overhead stream from wash column 19.

Fractionator 55 serves to separate the catalyst residues and soluble polymer from liquid propylene stream 19. Said catalyst residues and soluble polymer together with a small amount of liquid propylene (to provide a pumpable stream of reduced viscosity) are removed from fractionator 55 by 26 and passed to recovery or other processing steps.

The overhead from fractionator 55, containing propylene and hydrogen, is condensed in cooler 56 and the effluent therefrom passed to accumulator 57. Part of the condensed overhead is used as reflux for fractionator 55, part is passed by 17 to wash column 54, and the remainder passed to degassing column 58 for separation of the hydrogen from propylene. The overhead propylene from fractionator 55 is thus advantageously used as wash liquid in column 54 without additional treatment.

Stream 17 is removed from accumulator 57 at a temperature of 110° F. and a pressure of 312 p.s.i.a and part of said stream flashed to a pressure of 20 p.s.i.a. with a resultant decrease in temperature to 20° F. The cold, flashed portion is passed through indirect exchanger 61 wherein it cools the remaining non-flashed portion to 60° F. The thus-cooled propylene at 60° F. is passed to wash column 54. Flash vapors from the flash step are passed to a lower portion of fractionator 55 via line 23.

The third portion from accumulator 57 is passed by pipe 25 into degasser 58 which is reboiled by reboiler 59 which separates a very pure propylene bottoms product from an overhead containing the hydrogen. The pure propylene is sent to reactor 51 as feedstock for the preparation of the desired propylene homopolymer and is accordingly passed to said reactor by 29. Hydrogen is vented by 28.

According to the invention, degassing column 58 is specifically designed and operated to separate a hydrogen-free propylene stream from a hydrogen-propylene feed stream while losing a minimum of propylene with the reject hydrogen. Thus column 58 contains about 15 contacting trays of the sieve or bubble-cap type. This number of trays permits complete stripping of all hydrogen from the descending liquid propylene in the column with a minimum of ascending propylene vapor generated by reboiler 59. Overhead vapors from column 58 are cooled to 112° F. at a pressure of 287 p.s.i.a to condense most of said vapors and all of the condensate returned to the column as reflux via pipe 64. That portion of the overhead vapors not condensed by cooler 59 and consisting largely of hydrogen but containing some propylene is passed through refrigerated section 63 wherein the vapors are cooled to about −15° F. at a pressure of 285 p.s.i.a. for condensation of most of the propylene vapor. The noncondensed gases vented from section 63 via pipe 28 thus consist largely of hydrogen with a minimum of propylene. Section 63 may contain about 12 contact trays or about 12 feet of contacting packing such as saddles or rings. Section 63 is cooled by refrigerant at about −40° F. to a jacket surrounding said section or to internal coils within said section. The cold refrigerant condenses most of the propylene vapor which liquid drains downward through the trays or packing into accumulator 60 and thence into column 58. Some of the liquid in accumulator 60 may be flashed to a pressure of 20 p.s.i.a. to provide aforementioned refrigerant at a temperature of −40° F. Or other suitable refrigerant at −40° F. may be used.

Degassing column 58 is operated at a top temperature and pressure of 123° F. and 303 p.s.i.a., respectively. It operates with a bottom temperature and pressure of 125° F. and 305 p.s.i.a., respectively. It is thus specifically designed and operated for separating hydrogen and propylene in the substantial absence of other components. In the presence of other components such as ethylene, propane, methane, etc., the hydrogen would not be completely removed from the propylene bottoms.

EXAMPLE

The following material balance presents flow rates of the principal components involved in the operation of my invention, that is the complete removal of hydrogen from the recycle propylene in a polypropylene plant so as to permit the addition of make-up hydrogen to the polymerization reactor feedstock as the only hydrogen entering said reactor.

| | Stream | | | | | | |
|---|---|---|---|---|---|---|---|
| | 1 | 4 | 10 | 14 and 16 | 19 | 18 | 17 |
| Component | Make-up propylene | Hydrogen | Reactor feed | Reactor effluent | Wash column overhead | Washed polymer | Propylene wash |
| Propylene | 128,560 | | 345,310 | 218,000 | 548,000 | 125,000 | 455,000 |
| Hydrogen | | 30 | 30 | 24 | 72 | 2 | 50 |
| Polypropylene | | | | 127,310 | | 127,310 | |
| Soluble polymer and catalyst residues | | | | 2,760 | 2,700 | 60 | |
| Total | 128,560 | 30 | 345,340 | 348,094 | 550,772 | 252,372 | 455,050 |
| | 23 | 26 | 24 | 25 | 28 | 29 | 64 |
| | Propylene refrigerant vapor | Soluble polymer catalyst reject | Propylene vapor | Feed to degassing column | Hydrogen reject | Purified propylene recycle | Degassing column reflux |
| Propylene | 118,000 | 750 | 125,000 | 217,250 | 500 | 216,750 | 225,000 |
| Hydrogen | 13 | | 2 | 24 | 24 | 0 | 50 |
| Polypropylene | | | | | | | |
| Soluble polymer and catalyst residues | | 2,700 | | | | | |
| Total | 118,013 | 3,450 | 125,002 | 217,274 | 524 | 216,750 | 225,050 |

The reader is referred to U.S. Pat. 3,356,667, the disclosure of which is incorporated herein by reference for details of the overall polymerization process, conditions, catalyst and modifier, descriptions and discussions there given.

As mentioned above, the present invention is carried out in the presence of hydrogen. The concentration of hydrogen employed in the polymerization of propylene must be controlled closely to a given value in order to achieve the desired properties for the propylene polymer product. The hydrogen concentration in the liquid monomer phase in the reaction zone ranges from 0.01 to 0.8 mole percent, preferably from 0.05 to 0.50 mole percent. By carrying out the polymerization of propylene in the presence of hydrogen within the above limits, solid propylene polymers having flexural modulus values of at least 200,000 p.s.i. and melt index values in the range from about 0.1 to about 100, preferably from 1 to 30, and reaction rates greater than 100 weight units of polymer per weight unit of $TiCl_3$ per hour can be achieved.

In Ser. No. 818,709, filed Apr. 23, 1969, by me, there is described and claimed a process for producing a solid mixed homo- and copolymer which comprises mass homopolymerizing a first monomer and then mass copolymerizing the polymer thus obtained with additional first and a second monomer, recovering and washing solid thus produced with an impure fraction of the monomers so reacted, the fraction being obtained by a fraction of unreacted excess monomers to produce a stream containing catalyst and any soluble polymer, a stream containing a mixture of the monomers, using a portion of the stream of monomers as said impure fraction, fractionating another portion thereof to obtain one of the monomers for the homopolymerization and a mixture of the monomers for said copolymerization.

Reasonable variation and modification are possible within the scope of the foregoing disclosure, the drawing and the appended claims to the invention the essence of which is that a method has been set forth and described wherein any modifier remaining in a solvent or medium to be recovered and reused in a catalytic operation is completely removed from said medium whereby correlation between incoming fresh modifier and modifier in the medium to be reused is completely avoided.

I claim:

1. A method for the polymerization of a monomer in the presence of a catalyst, a solvent which is recovered and which can be reused and hydrogen as a catalyst modifier which normally is recovered and reused which comprises in a polymerization zone polymerizing a monomer in the presence of said catalyst, said solvent and said modifier, recovering polymer from said solvent, recovering catalyst residue from said solvent, removing from said solvent all of the modifier remaining therein when said solvent has been recovered and then reusing said solvent whereby correlation of modifier and reused solvent with fresh modifier entering said zone is avoided and modifier can be and is added to said zone in only a single feed.

2. A method according to claim 1 wherein the monomer is an olefin.

3. A method according to claim 1 wherein the monomer is propylene.

4. A method according to claim 1 wherein the solvent is propylene, the modifier is hydrogen, the used solvent following recovery therefrom of the polymer formed and catalyst residues is fractionated in a reboiled fractionation zone under conditions to yield bottoms which are essentially pure propylene, the top of the fractionation zone is refrigerated so as to retain propylene while allowing hydrogen to be vented therefrom.

5. A method according to claim 1 wherein the solvent is propylene.

References Cited
UNITED STATES PATENTS

| | | | |
|---|---|---|---|
| 3,084,149 | 4/1963 | Stevens et al. | 260—94.9 |
| 3,178,360 | 4/1965 | Hawkins et al. | 260—93.7 X |
| 3,262,922 | 7/1966 | Payne | 260—93.7 |
| 3,280,090 | 10/1966 | Scoggin | 260—93.7 |
| 3,349,010 | 10/1967 | Plaster | 260—94.9 X |
| 3,356,667 | 12/1967 | Smith et al. | 260—93.7 |

JAMES A. SEIDLECK, Primary Examiner

W. F. HAMROCK, Astsistant Examiner

U.S. Cl. X.R.

260—85.3, 88.2 S, 94.9 F, 95 R, 96 R